United States Patent Office 2,972,567
Patented Feb. 21, 1961

2,972,567

METHOD OF PRODUCING CLINICAL DEXTRAN

Leo J. Novak and Everette E. Witt, Dayton, Ohio, assignors to The Commonwealth Engineering Company of Ohio, Dayton, Ohio No Drawing. Filed July 11, 1957, Ser. No. 671,138

2 Claims. (Cl. 195—31)

This invention relates to a method of producing dextran of a desired molecular weight by a simplified method.

The invention provides for the production of dextran having a controlled molecular weight and which is useful similarly as so-called clinical dextran.

Dextran is generally produced by fermentation methods. For example, by inoculating with suitable selected bacteria, such as those of the *Leuconostoc mesenteroides* or *L. dextranicum* types, a sucrose-bearing medium containing nitrogenous substances and certain inorganic salts, and incubating the culture at the temperature most favorable to the growth of the particular microorganism. Native dextran thus produced by the fermentation of sucrose in aqueous solutions with the enzyme dextran sucrase have a molecular weight of several million.

For certain purposes it is required that native dextran be degraded to a molecular weight averaging about 75,000. This may be done either by acid hydrolysis or by enzymatic degradation using *Aspergillus wentii* as the enzymatic splitting agent. The use of this enzyme derivation from *Aspergillus wentii* as the splitting agent is described in U.S. patent of Carlson et al. No. 2,709,150. In making use of either acid hydrolysis or enzymatic procedure, additional facilities are required for carrying out the operation.

In accordance with the method of the present invention, dextran is synthesized by dextran sucrase and it is concurrently degraded by *Aspergillus wentii* enzyme to a predetermined molecular weight.

The following examples are given to show how the invention may be carried out to produce a dextran of the desired molecular weight without decreasing the total yield:

EXAMPLE I

Two series I and II comprising five test tubes each were prepared for determining the compatibility of enzyme with dextran sucrase having a potency of 40 units per ml. (one dextran sucrase unit is defined as the amount of enzyme which will convert one mg. of sucrose to dextran in one hour under standard conditions, e.g., 72° F., and 760 mm. pressure).

Five ml. of dextran sucrase were added to each test tube of both series.

To each tube of series number I, five ml. of a 20% sucrose solution were added. Since the theoretical conversion of sucrose to dextran is 47.3%, each tube was calculated to contain a maximum of 0.473 gm. of dextran after completion of the fermentation.

To each tube of series number II, five ml. of a 10% dextran solution were added. Each tube was calculated to contain 0.5 gm. of dextran.

Varying concentrations of *Aspergillus wentii* were added to each tube of both series and the tubes allowed to stand at room temperature for 18 hours.

The relative viscosity of the fermentation liquor in each tube was determined and an equal volume of methanol added to precipitate the dextran.

Table I shows the influence of *Aspergillus wentii* enzyme on the viscosity of the fermentation liquor and the amount of dextran produced and/or recovered.

*Table I.*—Influence of Aspergillus wentii *enzyme on the viscosity of the fermentate and yield of dextran*

SERIES I

| Volume Percent *Aspergillus wentii* | Relative Viscosity | Percent of theoretical Dextran Yield |
|---|---|---|
| 10 | 1.25 | 10.1 |
| 5 | 1.38 | 34.6 |
| 1 | 2.22 | 81.2 |
| 0.1 | 15.25 | 97.8 |
| 0.01 | 73.80 | 100.0 |

SERIES II

| | | |
|---|---|---|
| 10 | 1.20 | 13.0 |
| 5 | 1.25 | 38.0 |
| 1 | 1.74 | 73.4 |
| 0.1 | 14.18 | 92.0 |
| 0.01 | 35.74 | 88.0 |

EXAMPLE II

To three test tubes containing 5 ml. of dextran sucrase and 5 ml. of a 20% sucrose solution varying concentrations of *Aspergillus wentii* enzyme were added. The tubes were incubated at room temperature for 14.5 hours. The theoretical yield of dextran in each tube was 47.3% of the sucrose or 0.473 grams. For comparison of dextran yields and the inherent viscosity obtained, a control test tube was prepared containing 5 ml. of dextran sucrase and 5 ml. of a 10% dextran solution.

After standing 14.5 hours the dextran in each tube was precipitated with methanol.

Table II shows the amount of dextran obtained calculated as the percent of the theoretical yield of 0.473 gm. (or 0.5 gm. for the control). The inherent viscosity of the precipitated dextran was also determined and the results recorded in Table II.

*Table II.*—Influence of Aspergillus wentii *enzyme on the percent of dextran recovered and the inherent viscosity*

| Percent *Aspergillus wentii* | Percent Dextran Recovered | Inherent Viscosity |
|---|---|---|
| 5.0 | 60.0 | 0.155 |
| 1.0 | 81.8 | 0.257 |
| 0.1 | 83.3 | 0.713 |
| Control: 1.0 | 62.4 | 0.257 |

The government specification for the inherent viscosity of dextran blood plasma volume expander having a weight average molecular weight of 75,000 is 0.18 to 0.28 dl/gm.

EXAMPLE III

This experiment was carried out in order to determine what proportion of the total dextran produced had a molecular weight in the range suitable for blood plasma substitute. The U.S. Government specification for the molecular weight of dextran blood plasma volume expander is from 50,000 to 100,000 with an average of 75,000. Dextran having a molecular weight in this range precipitated in methanol concentration between 42.6% and 50% by volume.

Three sucrose fermentations were carried out containing 2, 3 and 4% *Aspergillus wentii* enzyme. On completion of the fermentation the total dextran produced was precipitated by adding methanol to 60% by volume.

The dextran from each fermentation was redissolved in a 5% aqueous solution. The portion of dextran having a molecular weight of 50,000 to 100,000 was isolated by alcohol fractionation. Table III shows the percent of dextran recovered having the desirable molecular weight range.

Table III

| Percent *Aspergillus wentii* in fermentation | Percent of total dextran having M.W. of 50,000 to 100,000 |
|---|---|
| 2 | 33.2 |
| 3 | 25.3 |
| 4 | 31.1 |

ASPERGILLUS WENTII ENZYME

In the example referred to above, the *Aspergillus wentii* enzyme used consists of a mold solution perpared as follows:

We first grow the mold for the production of the enzyme in the presence of a nutrient medium whose active ingredients are a combination of dextran-salts-vitamin mixture enriched with a source of amino acids. The dextran just mentioned is not the general mass dextran that later will be hydrolyzed by the action of this enzyme. Our purpose in using the relatively small amount of dextran in the nutrient is to acclimatize the mold and its enzyme so produced to the dextran with which it will be ultimately associated in large quantities. At least, this we find to be an important factor and this is our theory.

A typical medium comprising this nutrient which causes the mold to grow rapidly within a few days to produce a solution rich in dextranase is as follows—

Component:
- Peptone _____ grams, liter__ 5.0
- Dextran salts soltuion _____ do____ 10.0
    - MgSO$_4$ _____ do____ 0.1
    - NaCl _____ do____ 0.1
    - FeSO$_4$ _____ do____ 0.01
    - MnSO$_4$ _____ do____ 0.01
    - KH$_2$PO$_4$ _____ do____ 0.1
    - NaOAc _____ do____ 0.5
    - KoAc _____ do____ 0.5
- B-vitamins—
    - Nicotinic acid _____ milligrams, liter__ 1.0
    - Riboflavin _____ do____ 0.5
    - Thiamine _____ do____ 0.5
    - Ca pantothenate _____ do____ 0.5
    - Pyridoxine _____ do____ 0.4
    - Folic acid _____ do____ 0.01
    - Biotin _____ do____ 0.001

The above medium is very satisfactory from the viewpoint of enzyme production.

A portion of the medium obtained from growth of our strain of *Aspergillus wentii* in medium PV (Table I) was filtered to provide a clear filtrate of the enzyme solution, and which is referred to as *Aspergillus wentii* enzyme in the examples.

The invention provides a method for the preparation of clinical dextran, commonly referred to as dextran B-512 in the art, and having a molecular weight suitable for the preparation of dextran blood plasma volume expander without employing acid hydrolysis as a separate operation.

In accordance with the process of the invention, it has been found that clinical dextran can be prepared by enzymatic synthesis of native dextran from sucrose with simultaneous balancing of the hydrolysis with enzyme *Aspergillus wentii*. An important feature of the invention is the discovery from tests that the dextran producing enzyme and hydrolytic *Aspergillus wentii* enzyme are compatible in a common medium and that by adding the latter enzyme to sucrose and processing as described, a dextran is produced having an average molecular weight of 75,000 as indicated by the viscosity. Moreover, the process of the invention makes possible the production of a dextran degraded in situ to a desired average molecular weight as required of clinical dextran. In this manner, the conventional steps of subsequently treating dextran of high molecular weight is avoided and a simplified and less expensive method provided for the production of clinical dextran.

What is claimed is:

1. A method of producing clinical dextran for use as a blood plasma extender by synthesizing crude dextran by inoculating a sucrose-bearing nutrient medium with *Leuconostoc mesenteroides* in situ with the concurrent cultivation of *Aspergillus wentii* enzyme and resulting in the hydrolytic degradation action of said enzyme on said crude dextran as formed to produced a degraded dextran having a molecular weight within the range of 50,000 to 100,000.

2. A method of producing clinical dextran for use as a blood plasma extender by synthesizing crude dextran by inoculating a sucrose-bearing nutrient medium with *Leuconostoc mesenteroides* in situ with the concurrent cultivation of *Aspergillus wentii* enzyme and resulting in the hydrolytic degradation action of said enzyme on said crude dextran as formed to produce a degraded dextran having an average molecular weight of 75,000, and which is precipitated by the addition of methanol.

References Cited in the file of this patent
UNITED STATES PATENTS

| | | |
|---|---|---|
| 2,660,551 | Koepsell et al. | Nov. 24, 1953 |
| 2,686,147 | Tsuchiya et al. | Aug. 10, 1954 |
| 2,709,150 | Carlson et al. | May 24, 1955 |
| 2,717,853 | Shurter | Sept. 13, 1955 |
| 2,726,985 | Hellman et al. | Dec. 13, 1955 |
| 2,841,578 | Novak et al. | July 1, 1958 |